United States Patent
Mueller et al.

(10) Patent No.: US 10,046,658 B2
(45) Date of Patent: Aug. 14, 2018

(54) ELECTRICAL CABLE ASSEMBLY FOR ELECTRIC VEHICLE

(71) Applicant: Lear Corporation, Southfield, MI (US)

(72) Inventors: Mark Anthony Mueller, Fenton, MI (US); David A. Hein, Sterling Heights, MI (US); Mary Mueller, Fenton, MI (US); Aric Henderson Anglin, Rives Junction, MI (US)

(73) Assignee: Lear Corporation, Southfield, MI (US)

( * ) Notice: Subject to any disclaimer, the term of this patent is extended or adjusted under 35 U.S.C. 154(b) by 733 days.

(21) Appl. No.: 14/327,880

(22) Filed: Jul. 10, 2014

(65) Prior Publication Data

US 2015/0035483 A1 Feb. 5, 2015

Related U.S. Application Data

(60) Provisional application No. 61/861,085, filed on Aug. 1, 2013.

(51) Int. Cl.
*H01R 31/06* (2006.01)
*B60L 11/18* (2006.01)

(52) U.S. Cl.
CPC ....... *B60L 11/1818* (2013.01); *B60L 11/1816* (2013.01); *H01R 31/06* (2013.01); *B60L 2230/12* (2013.01); *Y02T 10/7005* (2013.01); *Y02T 10/7088* (2013.01); *Y02T 90/121* (2013.01); *Y02T 90/14* (2013.01); *Y02T 90/16* (2013.01)

(58) Field of Classification Search
CPC ..... Y02T 90/14; Y02T 90/16; Y02T 10/7005; Y02T 10/7088; B60L 11/1816; B60L 11/1818; B60L 2230/12
See application file for complete search history.

(56) References Cited

U.S. PATENT DOCUMENTS

| 5,346,406 A | 9/1994 | Hoffman et al. |
| 5,369,352 A * | 11/1994 | Toepfer ................. B60L 3/0069 320/110 |
| 8,696,374 B2 | 4/2014 | Oe et al. |

(Continued)

FOREIGN PATENT DOCUMENTS

| DE | 102011007763 A1 | 10/2012 |
| DE | 102011106335 A1 | 1/2013 |

(Continued)

OTHER PUBLICATIONS

Application No. PCT/US2016/017439, entitled "Vehicle Charge-Cord System", filed Feb. 11, 2016.

*Primary Examiner* — Briggitte R Hammond
(74) *Attorney, Agent, or Firm* — Brooks Kushman P.C.

(57) ABSTRACT

An electrical cable assembly is provided with an electrical connector sized to be received into an electrical outlet. A cable is in electrical communication with the electrical connector. A lockable connector is in electrical communication with the cable. An adapter receptacle is sized to receive the lockable connector for electrical communication with the lockable connector. The lockable connector is lockable within the adapter receptacle. A vehicle connector assembly is in electrical communication with the adapter receptacle and is sized to be received by a vehicle receptacle to convey current to the vehicle receptacle.

6 Claims, 3 Drawing Sheets

(56) References Cited

U.S. PATENT DOCUMENTS

| | | |
|---|---|---|
| 8,729,856 B2 | 5/2014 | Nathan et al. |
| 8,884,773 B2 | 11/2014 | Wiesemann et al. |
| 2011/0029146 A1 | 2/2011 | Muller et al. |
| 2011/0204715 A1* | 8/2011 | Nakamura .......... B60L 11/1818 307/10.1 |
| 2011/0300753 A1* | 12/2011 | Ichikawa .............. B60L 3/0069 439/620.21 |
| 2012/0139335 A1* | 6/2012 | Holland ................ B60L 3/0069 307/9.1 |
| 2012/0282798 A1* | 11/2012 | Oe ...................... B60L 11/1816 439/369 |
| 2013/0201641 A1* | 8/2013 | Soden ....................... B60L 3/04 361/752 |
| 2013/0314034 A1* | 11/2013 | Ang ...................... B60W 20/00 320/107 |
| 2014/0035527 A1* | 2/2014 | Hayashigawa ..... B60L 11/1862 320/109 |
| 2014/0292272 A1* | 10/2014 | Inagaki .................. H01H 47/22 320/109 |
| 2014/0306520 A1 | 10/2014 | Oe et al. |
| 2015/0175020 A1 | 6/2015 | Kim et al. |
| 2015/0175023 A1 | 6/2015 | Williams et al. |
| 2016/0059719 A1 | 3/2016 | Jung |
| 2016/0059731 A1 | 3/2016 | Jung et al. |

FOREIGN PATENT DOCUMENTS

| | | |
|---|---|---|
| DE | 102013007330 A1 | 10/2014 |
| DE | 102013221652 A1 | 4/2015 |
| EP | 2360050 A2 | 8/2011 |
| WO | 2012139778 A2 | 10/2012 |
| WO | 2014005567 A1 | 1/2014 |

\* cited by examiner

ELECTRICAL CABLE ASSEMBLY FOR ELECTRIC VEHICLE

CROSS-REFERENCE TO RELATED APPLICATIONS

This application claims the benefit of U.S. provisional application Ser. No. 61/861,085 filed Aug. 1, 2013, the disclosure of which is hereby incorporated in its entirety by reference herein.

TECHNICAL FIELD

Various embodiments relate to electrical cable assemblies for electric vehicles.

BACKGROUND

Standard electric vehicle supply equipment (EVSE) often utilizes a fixed cable assembly for conveying power to an electric vehicle.

SUMMARY

According to at least one embodiment, an electrical cable assembly is provided with an electrical connector sized to be received into an electrical outlet. A cable is in electrical communication with the electrical connector. A lockable connector is in electrical communication with the cable. An adapter receptacle is sized to receive the lockable connector for electrical communication with the lockable connector. The lockable connector is lockable within the adapter receptacle. A vehicle connector assembly is in electrical communication with the adapter receptacle and is sized to be received by a vehicle receptacle to convey current to the vehicle receptacle.

According to at least another embodiment, an electric vehicle supply equipment is provided with an electrical cable assembly. The electrical cable assembly is provided with an electrical connector sized to be received into an electrical outlet. A cable is in electrical communication with the electrical connector. A lockable connector is in electrical communication with the cable. An adapter receptacle is sized to receive the lockable connector for electrical communication with the lockable connector. The lockable connector is lockable within the adapter receptacle. A vehicle connector assembly is in electrical communication with the adapter receptacle and is sized to be received by a vehicle receptacle to convey current to the vehicle receptacle.

According to at least another embodiment, an interchangeable electrical cable assembly is provided with an adapter receptacle. A first lockable connector is sized to be received within the adapter receptacle for electrical communication with the adapter receptacle. The first lockable connector is lockable within the adapter receptacle. A first cable is in electrical communication with the first lockable connector. A first electrical connector is in electrical communication with the first cable. The first electrical connector is sized to be received into a first electrical outlet. A second lockable connector is sized to be received within the adapter receptacle for electrical communication with the adapter receptacle. The second lockable connector is lockable within the adapter receptacle. A second cable is in electrical communication with the second lockable connector. A second electrical connector is in electrical communication with the second cable. The second electrical connector is sized to be received into a second electrical outlet that is different than the first electrical outlet. A controller is in electrical communication with the adapter receptacle and the converter. The controller is configured to determine a voltage of an input alternating current.

According to at least another embodiment, an electric vehicle supply equipment is provided with an interchangeable electrical cable assembly. The interchangeable electrical cable assembly is provided with a vehicle connector assembly sized to be received by a vehicle receptacle to convey current to the vehicle receptacle. A first lockable connector is sized to be received within the adapter receptacle for electrical communication with the adapter receptacle. The first lockable connector is lockable within the adapter receptacle. A first cable is in electrical communication with the first lockable connector. A first electrical connector is in electrical communication with the first cable. The first electrical connector is sized to be received into a first electrical outlet. A second lockable connector is sized to be received within the adapter receptacle for electrical communication with the adapter receptacle. The second lockable connector is lockable within the adapter receptacle. A second cable is in electrical communication with the second lockable connector. A second electrical connector is in electrical communication with the second cable. The second electrical connector is sized to be received into a second electrical outlet that is different than the first electrical outlet. A controller is in electrical communication with the adapter receptacle and the connector. The controller is configured to determine a voltage of an input alternating current and to control the output alternative current based on the voltage.

According to at least another embodiment, an electrical cable assembly is provided with a vehicle connector assembly sized to be received by a vehicle receptacle to convey current to the vehicle receptacle. A cable is in electrical communication with the vehicle connector assembly. A housing is provided. An adapter receptacle is oriented upon the housing in electrical communication with the cable. The adapter receptacle is sized to receive an electrical connector for the input alternating current.

According to at least another embodiment, an electric vehicle supply equipment is provided with an electrical cable assembly. The electrical cable assembly is provided with a vehicle connector assembly sized to be received by a vehicle receptacle to convey current to the vehicle receptacle. A cable is in electrical communication with the vehicle connector assembly. A housing is provided. An adapter receptacle is oriented upon the housing in electrical communication with the cable. The adapter receptacle is sized to receive an electrical connector for the input alternating current.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
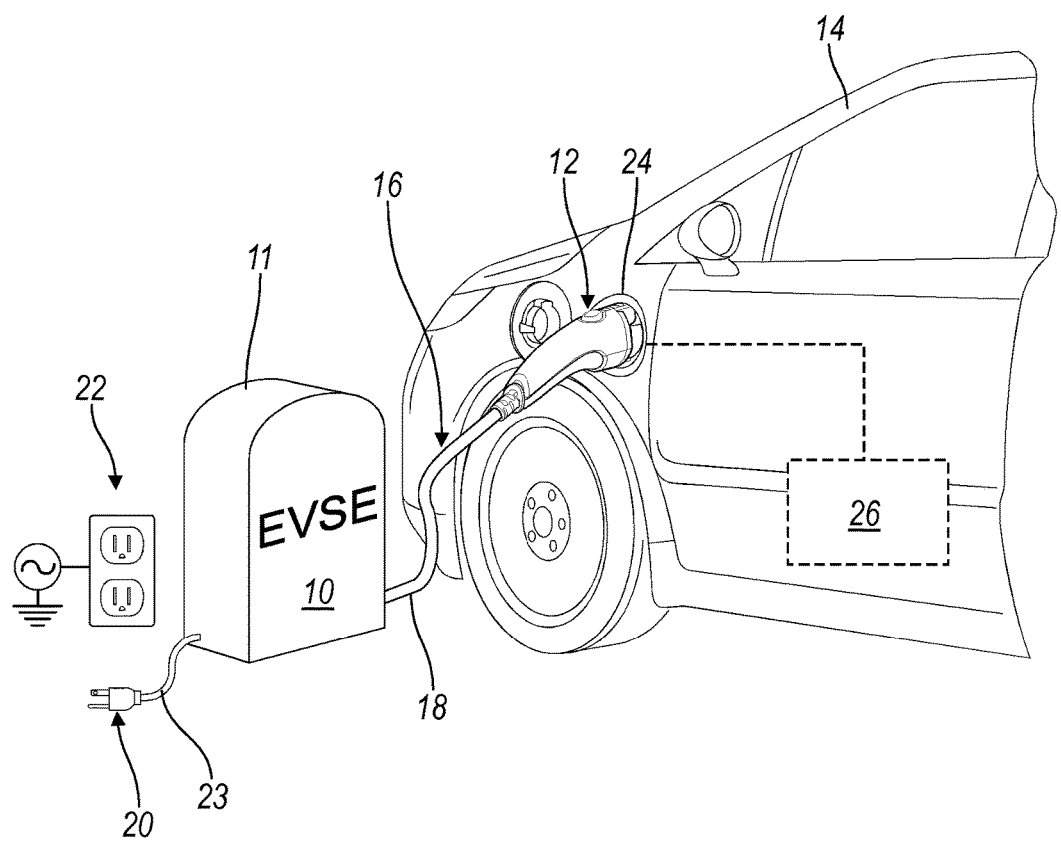
FIG. 1 is a perspective view of an electrical cable assembly according to an embodiment illustrated in cooperation with a vehicle and a power supply.

With reference to FIG. 1, an electric vehicle supply equipment (EVSE) is illustrated in accordance with an embodiment, and referenced generally by numeral 10. The EVSE 10 includes a housing 11 and a vehicle connector assembly 12 for facilitating electric charging of a vehicle 14. The vehicle connector assembly 12 is included in an electrical cable assembly 16, according to one or more embodiments. The electrical cable assembly 16 includes a charging cable 18 extending between the EVSE 10 and the vehicle connector assembly 12.

The EVSE 10 includes a power supply connector assembly 20 for connecting to an external power supply 22 for receiving electrical energy. The power supply connector assembly 20 includes a cable 23 connected to the EVSE 10. The external power supply 22 represents an alternating current (AC) electrical power supply, such as a standard residential power circuit. The EVSE 10 may be configured to monitor electrical energy passing through the cable 18 during charging. The electrical cable assembly 16 may be configured to be portable (as shown in FIG. 1) or fixed to a charging station (not shown).

The vehicle connector assembly 12 attaches to a "plug-in" vehicle 14, such as a hybrid electric vehicle, a battery electric vehicle, or the like, for supplying electrical energy to the vehicle 14. The vehicle 14 includes a vehicle charging receptacle 24 that is connected to a battery 26 for receiving and storing electrical energy. The vehicle charging receptacle 24 is mounted to be externally accessible from the vehicle 14. The vehicle charging receptacle 24 receives the vehicle connector assembly 12. The battery 26 is electrically connected to the vehicle charging receptacle 24 for storing electrical power. The vehicle 14 may also include a converter (not shown) for converting AC to DC electrical power for storage in the battery 26. The vehicle 14 may be an electric vehicle, or any suitable vehicle that receives external electric power.

An electric vehicle supply equipment (EVSE) Cord Set is often provided with a fixed power cord. A "Lockable" Quick connect alternating current (AC) Power Cord may function with various alternating current voltages supplies. For example, the cord set functions at both 120 and 240 Volts AC. Manufacturing and efficiencies are enhanced by this modular concept. This product allows the interchangeability of Power Cords giving the user more flexibility in charge rates and voltage. This also minimizes the occurrences of damaged power cords. The modularity allows interchangeability of plugs for different regions of the world and at different voltages. This concept allows the user to select the voltage and charge rate based on the power outlet available.

The "Lockable" Quick Connect allows different power cords to be installed on the unit. These Power Cords allow for different voltages or for different country plug requirements. According to one embodiment, a disconnect is provided on the power cord. According to another embodiment a disconnect is installed in an In-line Cable Control Box (ICCB). This device may also contain control pins and wires along with Power pins/wires. A mating portion of the connector can be mounted as a header on the control box enclosure.

Figure 2:
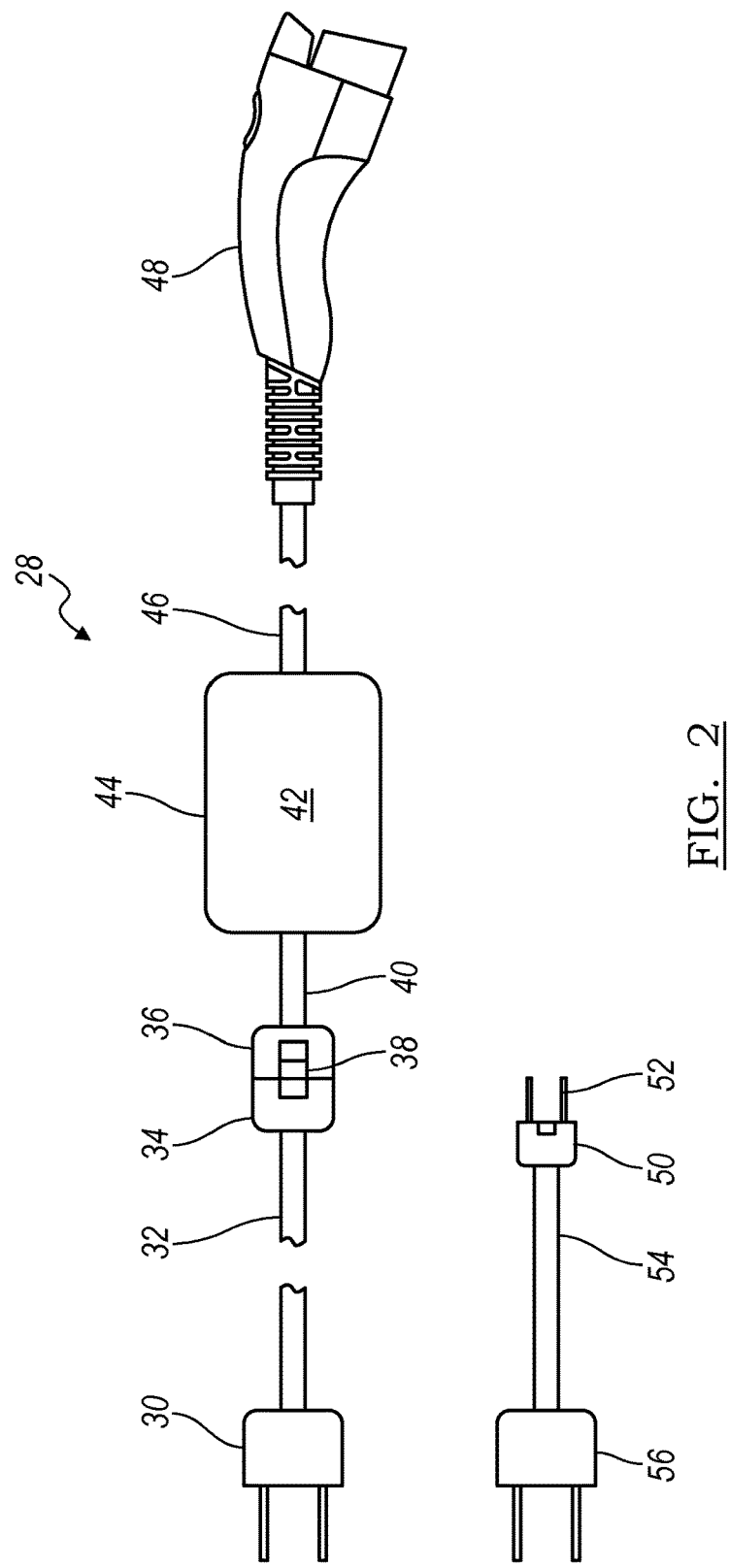
FIG. 2 is a side elevation view of an electrical cable assembly according to an embodiment.

Referring now to FIG. 2, an electrical cable assembly 28 is illustrated according to an embodiment. The electrical cable assembly 28 includes a first electrical connector 30 that is sized to be received into an electrical outlet. For example, the first electrical connector 30 may be a NEMA 5 (120 Volt) connector. A first cable 32 is in electrical communication with the electrical connector 30. A first lockable connector 34 is in electrical communication with the first cable 32. An adapter receptacle 36 is sized to receive the first lockable connector 34 for electrical communication with the lockable connector 34. A sliding lock 38 may be provided on the adapter receptacle 36 to lock the first lockable connector 34 to the adapter receptacle 36.

A second cable 40 is in electrical communication with the adapter receptacle 36 and extends to an In-line Cable Control Box (ICCB) 42. The ICCB 42 includes a housing 44 or control box, which retains a controller in electrical communication with the adapter receptacle 38.

A third cable 46 extends from the ICCB 42 in electrical communication with the ICCB 42. The third cable 46 is subsequently connected to a vehicle connector assembly 48, which is sized to be received by the vehicle receptacle 24 to convey direct current to the vehicle receptacle 24.

The electrical cable assembly 28 also includes a second lockable connector 50 that is sized to be received within the adapter receptacle 36 for electrical communication with the adapter receptacle 36. The second lockable connector 50 may include conductive pins 52 that are received within the adapter receptacle 36. The second lockable connector 50 is interchangeable with the first lockable connector 34, and likewise is also lockable within the adapter receptacle 36.

A fourth cable 54 connects the second lockable connector 50 to a second electrical connector 56 that is sized to be received into a different electrical outlet, such as a NEMA 6 (240 Volt) plug. The fourth cable 54 may have a diameter greater than a diameter of the first cable 32 for receipt of the corresponding input alternating current. The interchangeability of the first and second lockable connectors 34, 50 permits a user to select a desired electrical connector 30, 56 for a given electrical outlet. Of course any number and size of electrical connector 30, 56 may be provided, which may depend upon availability of power sources within a particular environment, region, country or the like.

The ICCB 42 may be configured to determine a voltage of an input alternating current by detection or by a input identification provided on the lockable connectors 34, 50.

Figure 3:
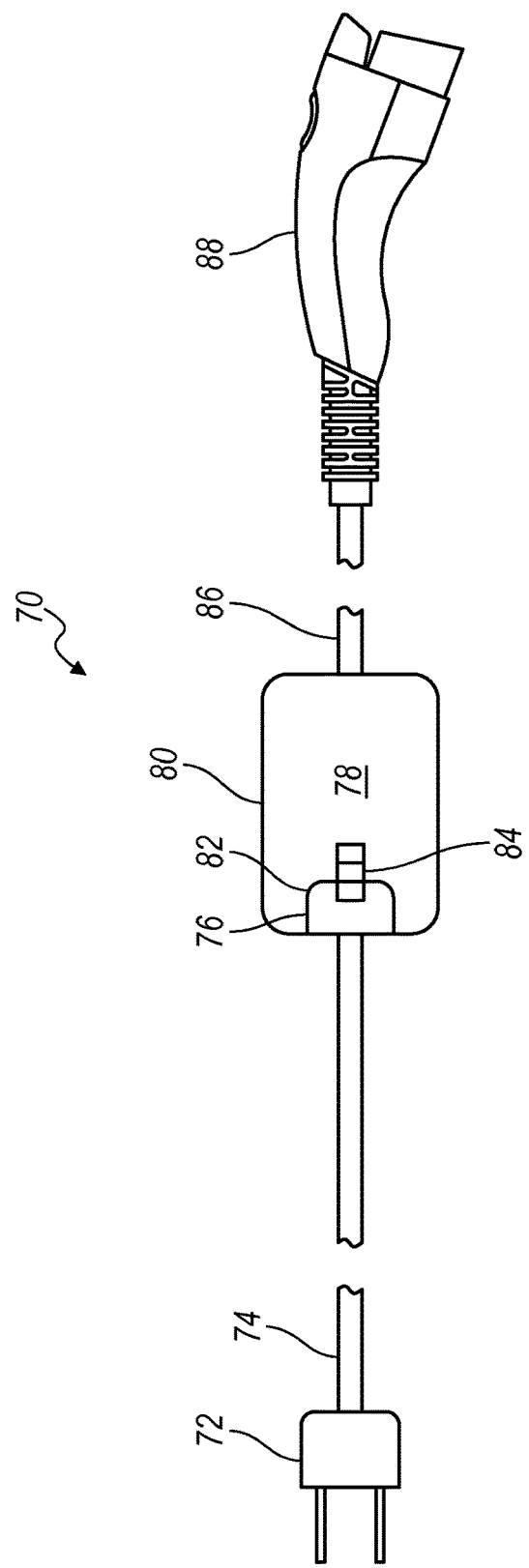
FIG. 3 is a side elevation view of an electrical cable assembly according to another embodiment.

FIG. 3 illustrates another electrical cable assembly 70 according to an embodiment. The electrical cable assembly 70 includes an electrical connector 72 that is sized to be received into an electrical outlet. For example, the electrical connector 72 may be a NEMA 5 (120 Volt) plug or a NEMA 6 (220 Volt) plug or an international plug. A first cable 74 is in electrical communication with the electrical connector 72. A lockable connector 76 is in electrical communication with the first cable 74.

An ICCB 78 includes a housing 80 for a controller. The housing 80 includes an adapter receptacle 82 sized to receive the lockable connector 76. A sliding lock 84 may be provided on the housing 80 to lock the lockable connector 76 to the adapter receptacle 82. A second cable 86 extends from the ICCB in electrical communication with the converter. The second cable 86 is connected to the EVSE 10, and a vehicle connector assembly 88, which is sized to be received by the vehicle receptacle 24 to convey current to the vehicle receptacle 24.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An interchangeable electrical cable assembly comprising:
   an adapter receptacle;
   a first lockable connector sized to be received within the adapter receptacle for electrical communication with the adapter receptacle, wherein the first lockable connector is lockable within the adapter receptacle;
   a first cable in electrical communication with the first lockable connector;
   a first electrical connector in electrical communication with the first cable, the first electrical connector being sized to be received into a first electrical outlet;
   a second lockable connector sized to be received within the adapter receptacle for electrical communication with the adapter receptacle, wherein the second lockable connector is lockable within the adapter receptacle;
   a second cable in electrical communication with the second lockable connector;
   a second electrical connector in electrical communication with the second cable, the second electrical connector being sized to be received into a second electrical outlet that is different than the first electrical outlet; and
   a controller in electrical communication with the adapter receptacle and the controller being configured to determine a voltage of an input alternating current.

2. The interchangeable electrical cable assembly of claim 1 wherein at least one of the adapter receptacle and the second lockable connector comprises conductive pins.

3. The interchangeable electrical cable assembly of claim 1 wherein at least one of the adapter receptacle and the second lockable connector comprises conductive pins.

4. The interchangeable electrical cable assembly of claim 1 wherein the first lockable connector and the second lockable connector are interchangeable with the adapter receptacle.

5. An electric vehicle supply equipment comprising:
   a vehicle connector assembly sized to be received by a vehicle receptacle to convey current to the vehicle receptacle; and the interchangeable electrical cable assembly of claim 1 in electrical communication with the controller.

6. The interchangeable electric cable assembly of claim 1 wherein the adapter receptacle comprises a sliding lock to lock one of the first lockable connector and the second lockable connector to the adapter receptacle.

* * * * *